(12) United States Patent
Bihler

(10) Patent No.: US 10,606,227 B2
(45) Date of Patent: Mar. 31, 2020

(54) METHOD FOR AUTOMATIC SWITCHING OF A COMMUNICATION RESISTOR OF A HART DEVICE IN OR OUT

(71) Applicant: Endress+Hauser Process Solutions AG, Reinach (CH)

(72) Inventor: Fabian Bihler, Rheinfelden (DE)

(73) Assignee: Endress+Hauser Process Solutions AG, Reinach (CH)

( * ) Notice: Subject to any disclaimer, the term of this patent is extended or adjusted under 35 U.S.C. 154(b) by 170 days.

(21) Appl. No.: 15/567,261

(22) PCT Filed: Mar. 24, 2016

(86) PCT No.: PCT/EP2016/056561
§ 371 (c)(1),
(2) Date: Oct. 17, 2017

(87) PCT Pub. No.: WO2016/165928
PCT Pub. Date: Oct. 20, 2016

(65) Prior Publication Data
US 2018/0107184 A1    Apr. 19, 2018

(30) Foreign Application Priority Data

Apr. 17, 2015   (DE) .......................... 10 2015 105 887

(51) Int. Cl.
*G05B 19/042* (2006.01)
*H04L 25/02* (2006.01)
(Continued)

(52) U.S. Cl.
CPC ............ *G05B 19/042* (2013.01); *H04L 25/02* (2013.01); *H04L 25/0298* (2013.01); *G08C 19/12* (2013.01); *G08C 25/00* (2013.01)

(58) Field of Classification Search
CPC .. F05B 19/042; H04L 25/025; H04L 25/0298; G08C 25/00; G08C 19/12
See application file for complete search history.

(56) References Cited

U.S. PATENT DOCUMENTS

2007/0120574 A1    5/2007   Houston et al.
2008/0015799 A1*   1/2008   Lalla .................... G01F 1/8409
                                                        702/65
(Continued)

FOREIGN PATENT DOCUMENTS

CN    102288849 A    12/2011
DE    19646219 A1    12/1997
(Continued)

OTHER PUBLICATIONS

Search Report for German Patent Application No. 10 2015 105 887.1, German Patent Office, dated Nov. 23, 2015, 6 pp.
(Continued)

*Primary Examiner* — Jeff W Natalini
(74) *Attorney, Agent, or Firm* — Mark A. Logan; PatServe

(57) ABSTRACT

Method for automatic switching of a communication resistor of a HART device in or out, wherein the method comprises steps as follows: transmitting a test signal on an electrical current loop; reading from the electrical current loop a test voltage signal, which is based on the transmitted test signal; comparing the test voltage signal with a reference signal; connecting the communication resistor into the electrical current loop when the test voltage signal exceeds the reference signal.

3 Claims, 2 Drawing Sheets

(51) Int. Cl.
G08C 19/12 (2006.01)
G08C 25/00 (2006.01)

(56) References Cited

U.S. PATENT DOCUMENTS

| | | | | |
|---|---|---|---|---|
| 2010/0214091 | A1* | 8/2010 | Thoren | H04L 12/40039 340/539.1 |
| 2011/0062942 | A1* | 3/2011 | Karbula | G05B 1/03 324/76.11 |
| 2011/0148511 | A1* | 6/2011 | Seiler | G05B 19/0423 327/540 |
| 2012/0020430 | A1* | 1/2012 | Haase | H03M 3/438 375/295 |

FOREIGN PATENT DOCUMENTS

| | | |
|---|---|---|
| DE | 102008043199 A1 | 4/2010 |
| DE | 102012106375 A1 | 1/2014 |
| DE | 102014105292 A1 | 11/2014 |

OTHER PUBLICATIONS

Search Report for International Patent Application No. PCT/EP2016/056561, WIPO, dated May 20, 2016, 10 pp.

* cited by examiner

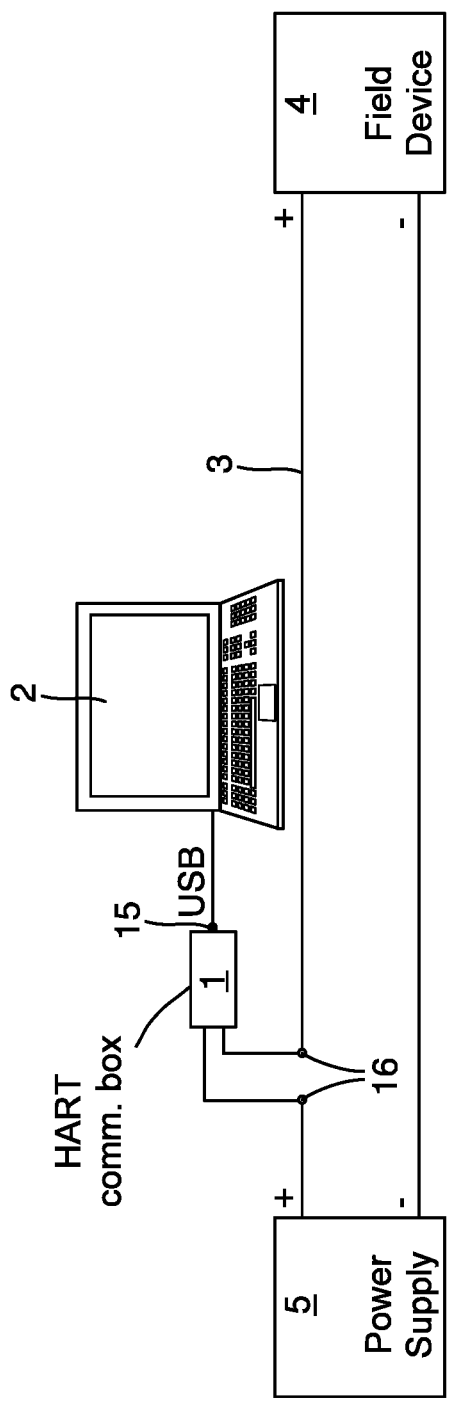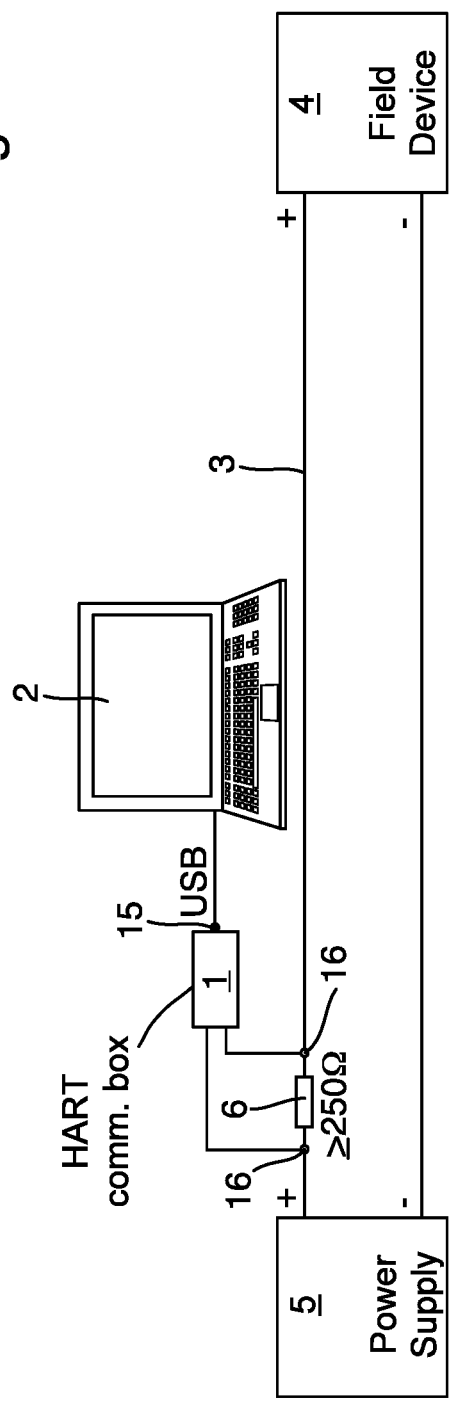

METHOD FOR AUTOMATIC SWITCHING OF A COMMUNICATION RESISTOR OF A HART DEVICE IN OR OUT

CROSS-REFERENCE TO RELATED APPLICATIONS

The present application is related to and claims the priority benefit of German Patent Application No. 10 2015 105 887.1, filed on Apr. 17, 2015 and International Patent Application No. PCT/EP2016/056561, filed Mar. 24, 2016, the entire contents of which are incorporated herein by reference.

TECHNICAL FIELD

The invention relates to a method for automatic switching of a communication resistor of a HART device (for example, a HART communication box) in or out.

BACKGROUND

In process technology as well as in automation technology, field devices are often applied, which serve for registering and/or influencing process variables. Serving for registering process variables are measuring devices, such as, for example, fill level measuring devices, flow measuring devices, pressure- and temperature measuring devices, pH measuring devices, conductivity measuring devices, etc., which register the corresponding process variables, fill level, flow, pressure, temperature, pH-value, and conductivity, respectively. Used for influencing process variables are actuators, such as valves or pumps, via which e.g. the flow of a liquid in a pipeline or the fill level of a medium in a container is changed. Referred to as field devices are, in principle, all devices, which are applied near to the process and which deliver, or process, process relevant information. A large number of such field devices are available from the group of firms, Endress+Hauser. In connection with the invention, the concept, field device, thus, refers to all types of measuring devices and actuators. Furthermore, the concept, field device, includes, however, also e.g. a gateway, a radio adapter or other bus participants integrated/integrable in a bus system.

Control occurs, in such case, from a control system, which is connected with the individual field devices via a data bus. All information needed for the control are exchanged between the control system and the field devices via the data bus, also called a fieldbus.

An often applied data-, or fieldbus, works according to the HART standard of the HART® Foundation. Field devices working according to the HART standard are also referred to as HART devices.

Besides the transmission of measured values, field devices allow also the transmission of other kinds of information stored in the field device, information such as e.g. configuration- and/or parameter data (zero-point, measured value range, etc.), measurement curves as well as diagnostic information. The parameters can be set by the control system or from a service- and display device.

This procedure is also referred to as configuring and/or parametering of the field device. The data for this are referred to as configuration- and/or parametering data.

In the case of each initial installation or in the case of a device replacement, the field device must be configured and/or parametered.

For this, a service- and/or observation software runs, most often, on a portable computer unit (PC, laptop), which is connected, for example, via a USB- or also a serial, COM interface (e.g. RS232, RS485) with an apparatus connected to the fieldbus, a so-called HART communication box, for transmission of the configuration- and/or parametering data.

In order to establish a HART-standard conforming communication between such a HART communication box and a field device, an impedance matching is required, since only such a so-called "low-impedance" (acronym: LI) installation is permitted within the corresponding electrical current loop.

Since current field devices have both "low-impedance" as well as also "high-impedance" (acronym HI) interfaces, a service technician must take care that the HART communication box is appropriately matched and connected to the electrical current loop. This can occur, for example, using a particular HART communication box, in the case of which a corresponding communication resistor (also called the load) is switchable in by means of a switch. Alternatively, a service technician can manually introduce a corresponding resistor into the existing installation.

Both variants assume that the service technician knows whether a communication resistor must be connected or whether a communication resistor is already present and, thus, does not have to be switched in.

In the case of both variants, for example, by incorrect positioning of the manual switch of the HART communication box or also by manual introduction of an additional communication resistor not actually required, problems can arise as follows:

1.) If in the installation, for instance in the electrical current loop, two communication resistors are connected in parallel when they should not be, the impedance and therewith the signals, i.e. the signal amplitudes, can lessen in such a manner that communication is no longer possible.
2.) If in the installation no communication resistor is present and two "high-impedance" devices are connected together, the signals, i.e. the signal amplitudes, get larger and the inputs of the communication box can be overloaded. This can lead to communication problems or even to complete loss of communication.

An object of the invention is to enable an as defect free as possible HART communication connection.

SUMMARY

The object is achieved by a method and a HART device.

As regards the method, the object is achieved by a method for automatic switching of a communication resistor of a HART device in or out, wherein the method has steps as follows:

transmitting a test signal on an electrical current loop;
reading from the electrical current loop a test voltage signal, which is based on the transmitted test signal;
comparing the test voltage signal with a reference signal;
connecting the communication resistor into the electrical current loop when the test voltage signal exceeds the reference signal.

According to the invention, thus the communication resistor of the HART device, for example, a HART communication box, is switched in or out. The automatic switching in or out of the communication resistor, i.e. the load, assures an as defect free as possible communication connection and prevents the above described problems. Thus, the application of the HART device is simplified and its operability improved.

An advantageous form of embodiment of the method of the invention provides that a preamble within a HART communication is used as test signal.

The HART protocol is based on transmission of data telegrams, which are introduced by a so-called preamble phase, in which at least five to at most 20 characters with the value 0×FF are sent. The preamble serves, in such case, for synchronization between master and slave.

An advantageous form of embodiment of the method of the invention provides that the read test voltage signal is filtered, before it is compared with the reference signal. In such case, a first variant provides that the test voltage signal is filtered through a bandpass filter with a center frequency of about 1200 Hz and a second, alternative variant provides that the test voltage signal is filtered through a lowpass filter with a limit frequency of about 1200 Hz.

An advantageous form of embodiment of the method of the invention provides that the comparing of the test voltage signal with the reference signal occurs over a predefined duration and only when the test voltage signal exceeds the reference signal for the predefined duration is the communication resistor connected.

Another advantageous form of embodiment of the method of the invention provides that before the transmitting of a test signal, the communication resistor is switched out.

Another advantageous form of embodiment of the method of the invention provides that, after switching in of the communication resistor, a carrier detect signal is used for verification and, when the carrier detect signal indicates a valid carrier signal, the communication resistor remains switched in. Especially, it can be provided that when the carrier detect signal indicates an invalid carrier signal, the communication resistor is switched out.

As regards the HART device, the object is achieved by a HART device with a to communication electronics, which is designed for performing the above described method of the invention.

BRIEF DESCRIPTION OF THE DRAWINGS

The invention will now be explained in greater detail based on the appended drawing, the figures of which show as follows:

FIG. 1 shows a schematic representation of a HART communication box known from the state of the art and connected to an electrical current loop, or a control loop, with a communication resistor, FIG. 2 shows a schematic representation of the HART communication box, which is connected via a communication resistor to the electrical current loop, or the control loop.

DETAILED DESCRIPTION

Figure 3:
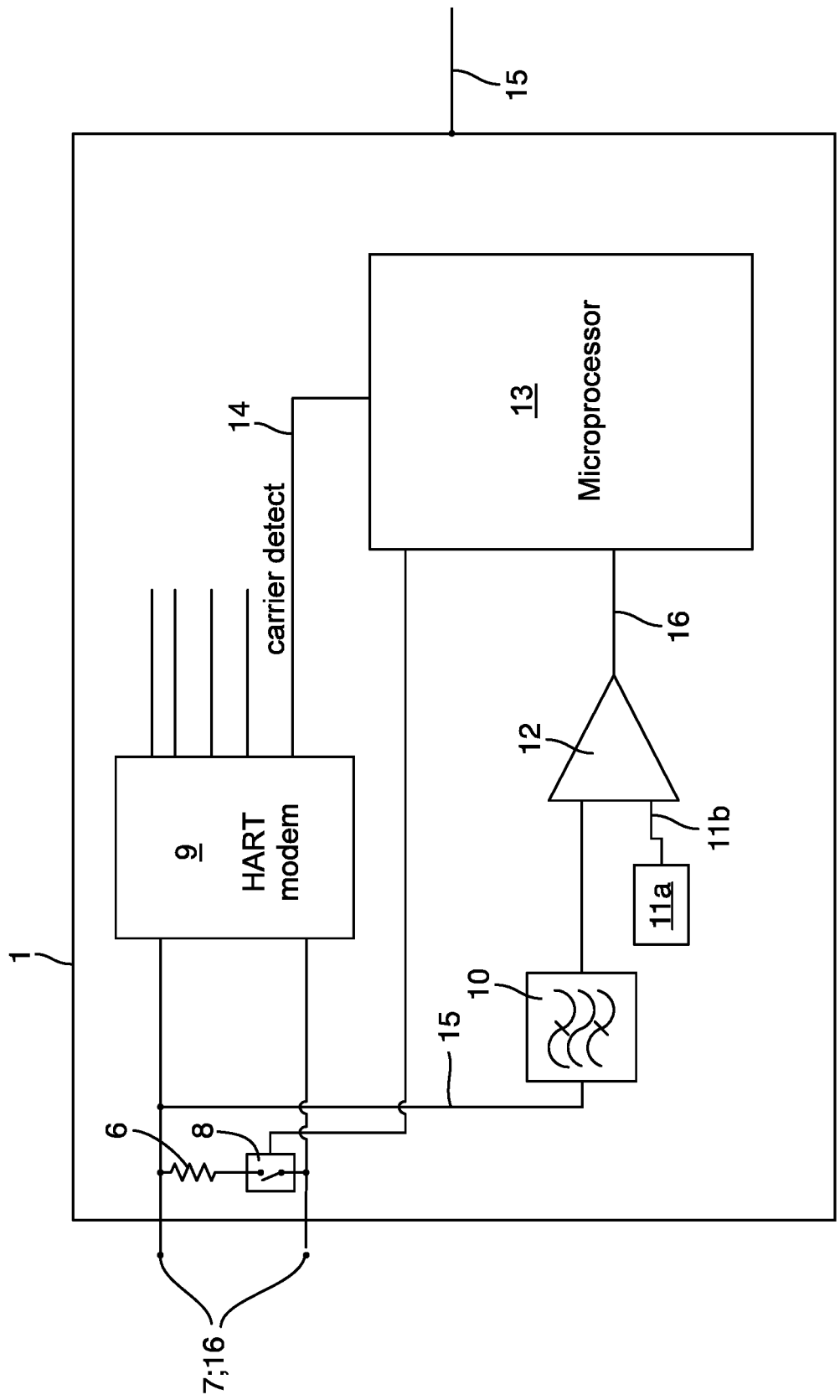
FIG. 3 shows a schematic representation a HART device of the invention in the form of a HART communication box with a communication electronics, which is designed to execute the method of the invention.

FIGS. 1 and 2 show the two connection variants known from the state of the art of a HART communication box 1 connected to an electrical current loop, or to a control loop, 3. In such case, the HART communication box 1 has been selected for purposes of explanation. The invention, is, however, in principle, applicable for any HART device.

FIGS. 1 and 2 show further, schematically, an installation in principle, in the case of which at least one field device 4 is connected via an electrical current loop 3 with at least one superordinated unit, for example, a control system or, such as shown in FIG. 1, a service unit 2.

In FIG. 1, the communication resistor 6 required for conforming HART communication is located within the HART communication box and not separately shown.

In contrast therewith, FIG. 2 shows an installation, in the case of which the required communication resistor 6, for example, one manually introduced by a service technician, is already present in the electrical current loop 3. In this case, the voltage signal is tapped across this resistor by the HART communication box 1.

Both the HART communication box 1 shown in FIG. 1 as well as also that shown in FIG. 2 have a first interface 15, which is embodied, for example, according to the USB-standard, and a second interface 16 in the form of connection terminals.

The first interface 15 connects the HART communication box 1 with the service unit 2, which serves for configuration and/or parametering of a field device 4. The USB connection shown in FIG. 1 is only by way of example, and other forms of communication connection, e.g. RS232, Bluetooth, etc. likewise provide options.

The HART communication box 1 is connected to the electrical current loop 3 via the second interface 16. Typically for this, the second interface 16 is implemented in the form of connection terminals.

Via the two interfaces 15 and 16, the HART communication box 1 connects the portable computer unit, e.g. service unit 2, with the electrical current loop 3 data conductively, so that via the service unit 2, on which a correspondingly provided service- and/or observation software is running, and the electrical current loop 3, it is possible to communicate with a field device 4 connected to the electrical current loop 3.

FIG. 3 shows a schematic representation of a HART device of the invention, i.e. a HART communication box 1 with a communication electronics located within the communication box 1. The communication electronics includes a computing unit, for example, a microprocessor 13 and a HART modem 9, which together implement the transfer of the data, especially configuration data and/or parametering data, between the first interface 15 and the second interface 16. In this way, configuration data and/or parametering data is transferred between the first interface 15, which is embodied according to the USB standard, and the second interface 16, which is embodied according to the HART standard.

In order to be able to practice the method of the invention described below, the communication electronics further includes a communication resistor, which can be automatically connected in or out via a switch operated by the microprocessor, and a comparator. Additionally, the communication electronics includes a filter element, for example, a bandpass filter- or low-pass filter. The filter element serves to filter out disturbance signals, which are produced, for example, by external EMC influences and, thus, to prevent an unintended influencing of the signal of interest. In principle, the invention can, however, also be practiced without the filter element.

The method of the invention assumes that one starts with the HART communication box 1 in the "high-impedance" state, i.e. the communication resistor 6 is normally switched out. In this way, only an erroneous scenario must be recognized: the defective connection of two HI devices, thus, for example, a HI field device and the HART communication box without a communication resistor switched in, i.e. with communication resistor switched out. The connection of two HI devices has the result that the signal level of the HART signal is too high. This is recognizable by analysis of peak values. In order to perform this analysis, a test signal is transmitted from the HART communication box 1 via the connection terminals and then a test voltage signal, which is based on the transmitted test signal, is read back. Opportunely, the preamble is used, which is composed of three or more transmitted 0xFF hexadecimals, which serve, in this case, both for synchronization as well as also test signal.

In order that an unintended, or erroneous, switching in of the communication resistor 6 is prevented as much as possible, it is advantageous to filter the test voltage signal (typically 1200 Hz signals) coming from the connection terminals of the HART communication box 1. This filtered signal is then fed to the comparator 12.

The comparator 12 serves for comparing the test voltage signal with a reference signal, or with a reference level. In the case, in which the reference signal, e.g. the reference level, is exceeded, the microprocessor connected to the comparator can use this as switching signal for the switching in of the communication resistor via the switch. Typically, the switching in of the communication resistor by the microprocessor is only performed after the reference level has been exceeded for a predefined duration. In this way, disturbing influences (EMC, etc.) can be minimized.

In order to enable a verification of the performed measure, advantageously a carrier detect signal is used, which is output from the HART modem 9. The carrier detect signal is a control signal, which is produced according to standard by the HART modem 9 and displays that it can receive data. Typically, this signal can only assume the logical states "high" or "low", respectively a binary one or a binary zero.

In the case, in which a valid carrier detect signal is present, it can be assumed therefrom that the signal received via the connection terminals is free of error. Thus, when the carrier detect signal assumes a logical binary one, or "high", the measure, thus the switching in of the communication resistor 6, is deemed successful. In contrast is the case, in which the carrier detect signal assumes a logical binary zero, whereupon the measure is deemed not successful and the switched in communication resistor 6 is switched back out.

LIST OF REFERENCE CHARACTERS

1 HART device, or HART communication box
2 service unit
3 electrical current loop, or control loop
4 field device
5 measurement transmitter, power supply
6 communication resistor, or load
7 connection terminals
8 switch
9 HART modem
10 filter
11 reference signal
12 comparator
13 computing unit, microcontroller
14 carrier detect signal
15 first interface
16 second interface

The invention claimed is:

1. A HART device, comprising:
a first interface configured to connect with a service unit;
a second interface configured to connect with an electrical current loop;
a microprocessor;
a HART modem having a carrier detect signal, wherein the HART modem is connected to the microprocessor, including the carrier detect signal connected with the microprocessor;
a communication resistor;
a switch controlled by the microprocessor, wherein the switch is configured in a first state to connect the communication resistor with the second interface, and wherein the switch is configured in a second state to disconnect the communication resistor from the second interface;
a filter element connected to the second interface and configured to filter out disturbance signals from a test voltage signal received via the second interface; and
a comparator connected to an output of the filter element, wherein the comparator is configured to compare the filtered test voltage signal with a reference signal, and wherein an output of the comparator is connected to the microprocessor,
wherein the microprocessor is configured to transmit a test signal on the electrical current loop, and to set the switch to the first state or to the second state based on the comparison of the filtered test voltage signal with the reference signal.

2. The HART device of claim 1, wherein filter element is a bandpass filter with a center frequency of about 1200 Hz.

3. The HART device of claim 1, wherein the filter element is a lowpass filter with a limit frequency of about 1200 Hz.

* * * * *